J. G. ARCHBOLD.
AUTOMATIC COUPLING FOR RAILWAY AND OTHER VEHICLES.
APPLICATION FILED MAR. 26, 1919.
1,309,057.
Patented July 8, 1919.
3 SHEETS—SHEET 1.
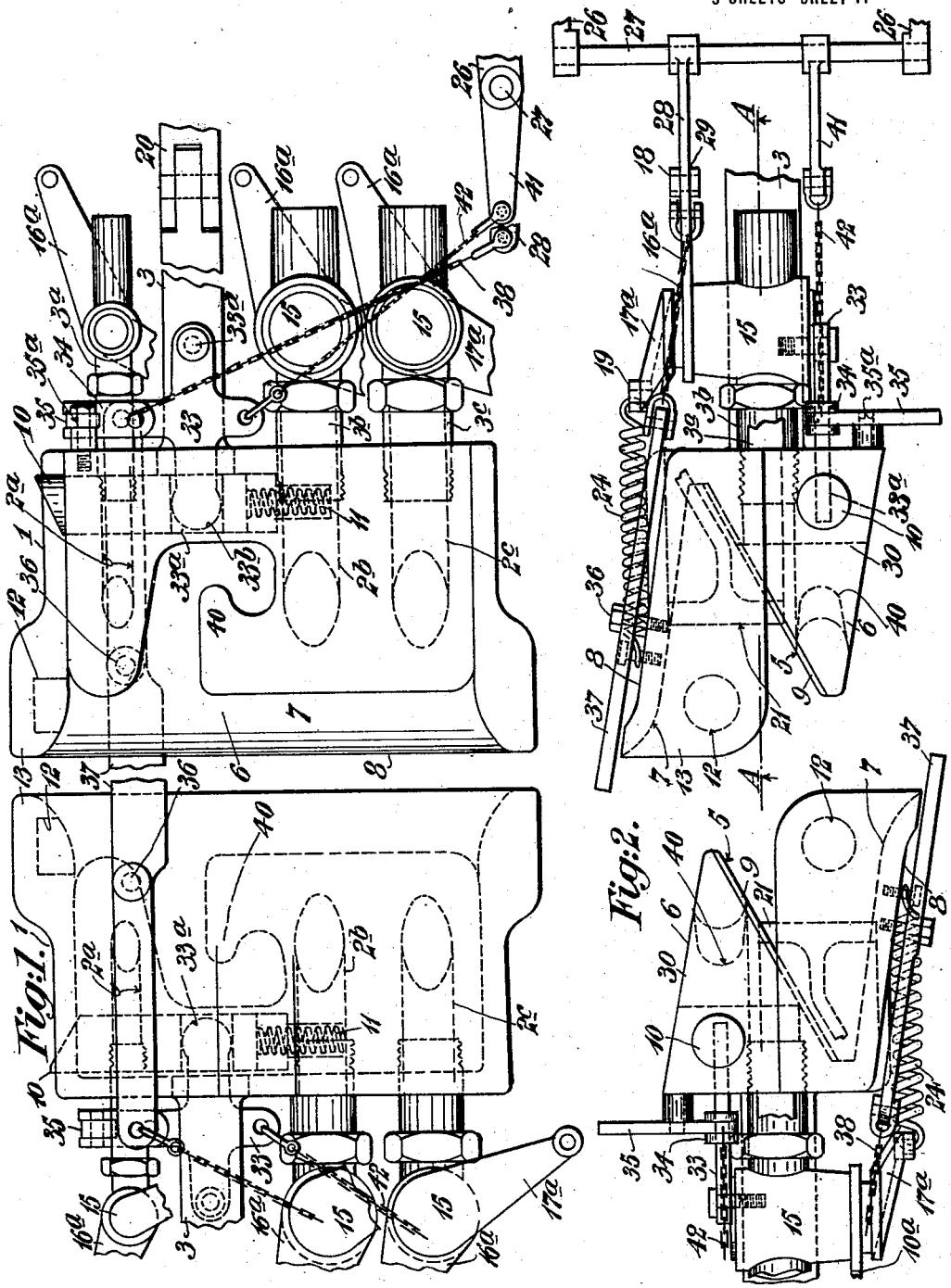
Inventor:
Joseph Gibson Archbold.
by R. Hadden
his Attorney.

J. G. ARCHBOLD.
AUTOMATIC COUPLING FOR RAILWAY AND OTHER VEHICLES.
APPLICATION FILED MAR. 26, 1919.
1,309,057.
Patented July 8, 1919.
3 SHEETS—SHEET 2.
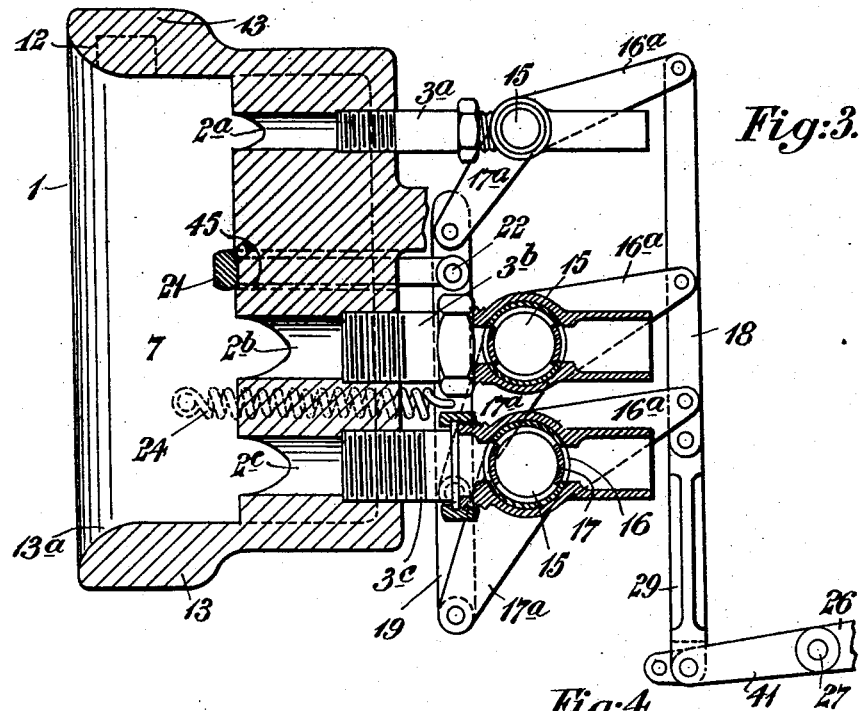
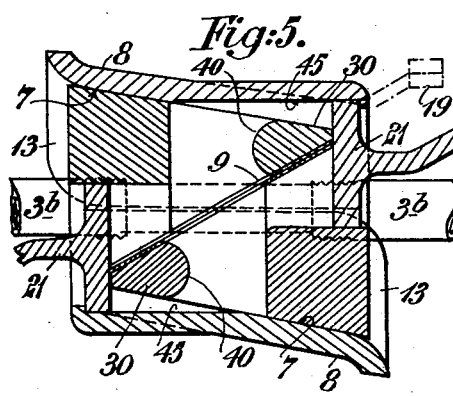
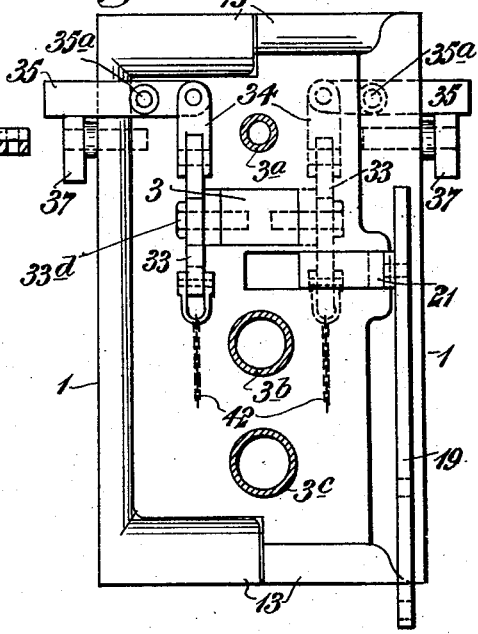
Inventor
Joseph Gibson Archbold.
by
his Attorney.

J. G. ARCHBOLD.
AUTOMATIC COUPLING FOR RAILWAY AND OTHER VEHICLES.
APPLICATION FILED MAR. 26, 1919.
1,309,057.
Patented July 8, 1919.
3 SHEETS—SHEET 3.
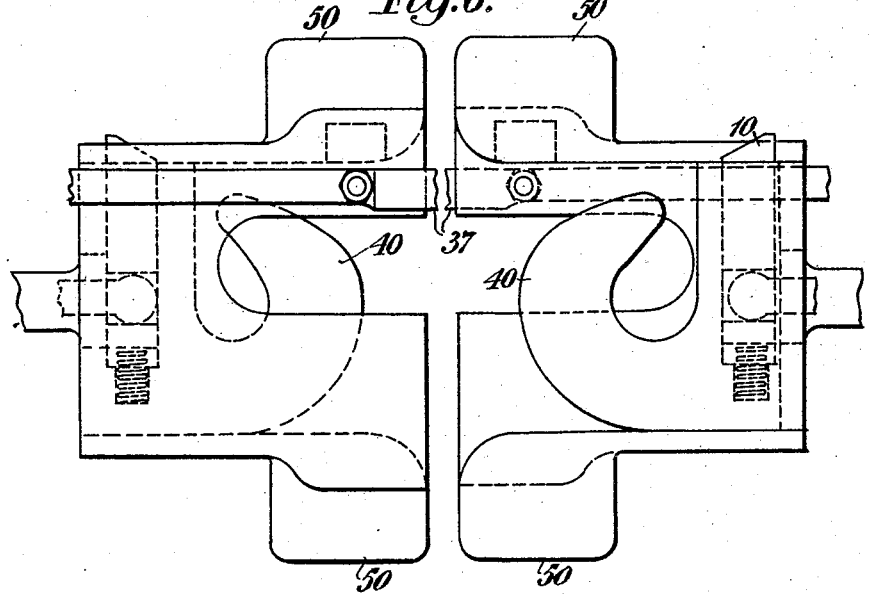
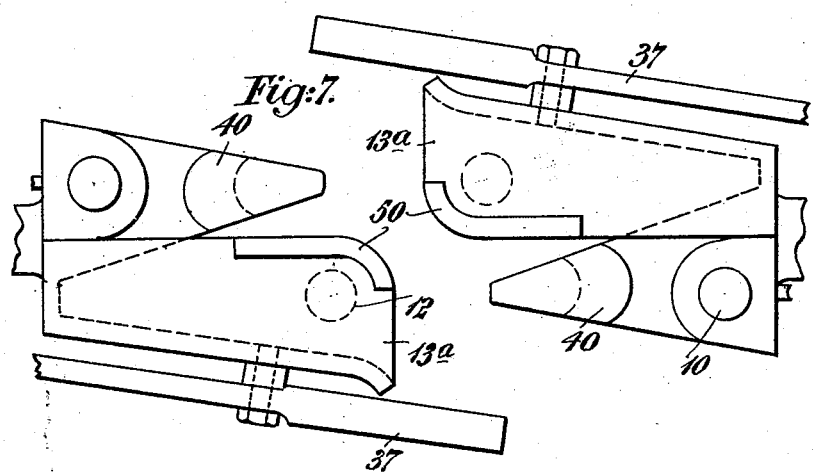
Inventor
Joseph Gibson Archbold.
by
his Attorney.

UNITED STATES PATENT OFFICE.

JOSEPH GIBSON ARCHBOLD, OF MONKSEATON, ENGLAND.

AUTOMATIC COUPLING FOR RAILWAY AND OTHER VEHICLES.

1,309,057.     Specification of Letters Patent.     Patented July 8, 1919.

Application filed March 26, 1919. Serial No. 285,329.

*To all whom it may concern:*

Be it known that I, JOSEPH GIBSON ARCHBOLD, of Monkseaton, in the county of Northumberland, engineer, a subject of the King of Great Britain and Ireland, have invented certain new and useful Improvements in and Relating to Automatic Couplings for Railway and other Vehicles, of which the following is a specification.

The invention relates to means for automatically coupling the brake, steam heating and other similar pipes of railway and other vehicles and also for coupling together the vehicles themselves, the invention also comprising a novel valve arrangement for connecting such pipes, the valves being so designed and interconnected with the vehicle coupling gear that they are automatically closed by the act of uncoupling the vehicles and opened to establish communication between the coupled vehicles upon the latter being brought together for coupling.

The invention is illustrated in the accompanying drawings, in which:—

Figure 1 shows in side elevation two coupling blocks in their uncoupled position:

Fig. 2 is a plan view of Fig. 1, showing also uncoupling hand levers:

Fig. 3 is a section of one coupling block on the line A—A of Fig. 2:

Fig. 4 is a horizontal section showing the two coupling blocks coupled together:

Fig. 5 is an end view of two coupling blocks, and

Figs. 6 and 7 are a side elevation and plan view respectively of parts of a modified form of block.

The coupling according to the invention comprises two coöperative block members 1, 1, each adapted for connection to the drawbar 20 (Fig. 1) of its vehicle as by means of a bar 3 fixed to each coupling member, and each block being provided with a plurality of bores $2^a$, $2^b$, $2^c$, corresponding to the number of pipes to be connected, three pipes being shown in the drawing, the said bores being adapted to have the respective pipes $3^a$, $3^b$, $3^c$, connected thereto. The coupling blocks are provided with corresponding inclined faces 5, adapted to abut to form the joint between the pipes, in which position the bores of one block register with the appurtenant bores of the other block.

The engagement of the blocks with each other to establish communication is effected by a wedging action, the blocks being provided on relatively opposite sides with inclined guide surfaces 6, which are adapted to coöperate with similar inclined faces 7 on wedge cheeks 8, formed on the block, there being a wedge cheek on each block disposed opposite the joint face 5. The arrangement is such that as the vehicles approach each other, the coupling members are wedged together, the wedge-shaped parts 30, 30, presenting the inclined faces 5, 6, engaging in the correspondingly shaped sockets having the inclined faces 5, 7, and finally locked together by the vehicle coupling device hereinafter described.

In order to allow a slight final movement of the coupling blocks and to cushion the shock due to their colliding, shock absorbing means, such as rubber buffers, springs, or balance weights (not shown) may be suitably arranged between the ends of the carriages and the rear of the coupling members or the drawbars may be fitted with tension and compression springs, so that the coupling blocks connected to the drawbars may serve as buffers. The face of the coupling members may, as shown, be covered with any suitable jointing material or washers 9, to insure a perfect joint. The means for coupling the vehicles together is of the class comprising spring influenced pins adapted to couple by engaging in corresponding sockets and consists of a spring influenced coupling pin or bolt 10 slidably arranged in each block, and adapted, under the action of its spring 11, to engage in a corresponding socket 12, provided in one of the two flanges 13 in the coöperating coupling member, each of the latter, therefore, having a catch and a socket. During the engagement of the blocks, the spring coupling bolts are forced back into their sockets by the flanges 13, the latter being suitably beveled at their edges $13^a$ for this purpose, and the bolts upon registering with the appurtenant sockets engaging therein.

The valves 15 for controlling the brake, steam-heating and other pipes, $3^a$, $3^b$, $3^c$, each comprise two coaxial ported plugs or sleeves 16, 17, preferably separated by an intermediate sleeve (not shown), the outer sleeves 16 of the several valves being all connected by their arms $16^a$ to a connecting rod 18, and the inner sleeves 17 similarly connected by arms $17^a$ to a rod 19. The connecting rod of one set of sleeves, as for instance the inner ones 17 as shown, is controlled by a push-bar 21, mounted for sliding movement in each of the coupling blocks, one end of the bar being pivotally connected at 22 to the connecting rod 19, and the other end being guided in grooves 45, provided in the faces 5, 7 of the parts 30 and 8 respectively, and adapted to be engaged by the member 30 of the other block, so that as the vehicles to be coupled approach each other, the push bars 21 are moved endwise against the action of springs 24, thereby moving the connecting rods 19 to open the valves 17. This coupled position of the coupling blocks and the consequent position of the push bars 21 and bar 19 is shown in Fig. 4.

Arranged in a convenient position for operation by hand at the side of each vehicle, and working preferably in a quadrant, is a pivoted uncoupling lever 26 fixed to a shaft 27, which is connected as by an arm 28, and a link 29 to the connecting rod 18 of the outer valve sleeves 16, and also as by a chain connection 38 to means for operating the coupling pins 10, said levers when in the coupling position holding the outer valve sleeves 16 in the open position, as shown in Fig. 3.

To uncouple, one of the uncoupling levers, according to which one is most convenient to operate, is lifted, whereby the outer valve sleeves 16 of all the valves are closed and the coupling bolts 10 are disengaged from the sockets 12. When the carriages part, the inner valve sleeves 17 under the action of spring 24, close automatically, the push-bars 21 now being released by the coöperating parts 30 of the other coupling blocks 1.

The interconnection of the coupling bolts 10 and their operative connection to the uncoupling levers 26, whereby they are both disconnected simultaneously is advantageously as follows:—Pivoted at 33$^d$ to each coupling block, as for instance to the bar 3, is a multi-armed trigger lever 33, one arm 33$^a$ of which projects through a slot in the end wall of the coupling block and engages in a slot 33$^b$ provided in the coupling bolt 10, and another arm having pivoted thereto a link 34 connected to one end of a horizontal lever 35 pivoted at 35$^a$ to the end face of the coupling block. The trigger lever 33 is operated from the shaft 27 by means of an arm 41 connected to said trigger lever as by a chain 42. Pivoted at 36 to the side of each block is an actuating lever 37, one end of which is connected as by a chain to the adjacent trigger lever of the same connecting block, or, as shown, to the arm 28, by chain 38, while the other end of lever 37 engages underneath, and is adapted to actuate, the horizontal lever 35 of the other coöperative coupling block. By this means, the coupling bolts 10 can be operated simultaneously by the uncoupling lever of either vehicle, and the uncoupling operation of levers 26 also effects the closure of the valves simultaneously.

The coupling blocks 1, 1, are each so formed as to provide coupling blocks 40, preferably that part 30 of each block presenting on opposite sides the guide and joint surfaces being suitably recessed to form a hook, so that a vehicle provided with a coupling device of this description may be coupled in conventional manner to another vehicle not so provided.

The blocks are identical in shape and therefore interchangeable.

In certain cases where the coupling is to be applied to vehicles such as goods trucks not provided with brake, steam heating or other similar pipes, the bores provided in the coupling blocks for this purpose would of course be omitted.

Figs. 6 and 7 show a pair of coupling blocks designed for such vehicles, the blocks being substantially the same as those hereinbefore described, with the essential difference that the flange portions 13$^a$ are provided at their forward ends with vertical ears 50, which are adapted to insure correct engagement of the blocks, even when the latter are comparatively considerably out of alinement with respect to each other, due to the frequent unequal loading of vehicles of the type in question.

What I claim as my invention and desire to secure by Letters Patent of the United States is:—

1. In an automatic coupling for vehicles, the combination of two coöperative coupling members, each comprising a triangular shaped block and an adjacent relatively inverted correspondingly shaped cavity, said triangular blocks being arranged to point in the direction of the draw bars and adapted to engage in the cavity of the other member so that their similarly inclined faces meet, a transverse snap operating bolt in each triangular block adapted to engage in a socket on the coöperating member, said meeting faces being adapted to be wedged together by coöperation of the opposite faces with the corresponding face of the cavity of the opposite member.

2. In an automatic coupling for vehicles, the combination with two coöperative coupling members each comprising a triangular shaped block and an adjacent relatively inverted correspondingly shaped cavity, said triangular shaped blocks being disposed to point in the direction of the draw bars and adapted to engage in the cavity of the other member so that their relatively inclined faces meet, a transverse socket engaging bolt in each triangular block adapted to engage in a socket in a flange on the coöperating member, said triangular blocks having passages running parallel to the axes of the draw bars and adapted to form straight through conduits for the communication of brake, steam heating and other pipes, said meeting faces being adapted to be wedged together by coöperation of the opposite faces with the corresponding face of the cavity of the opposite member.

3. In an automatic coupling for vehicles, the combination of two coöperating coupling members, each comprising a wedge-shaped block and an adjacent cavity of corresponding shape, the wedge block of one member being adapted to engage in the cavity of the other member, and the wedge blocks being provided with passages issuing on their meeting faces and adapted to form straight through conduits for the communication of brake, steam-heating and other pipes, valves on said pipes, each having two separately movable ported sleeves, uncoupling mechanism, means connecting one of said sleeves to the uncoupling mechanism, and means for automatically closing the other of said sleeves when the members are uncoupled, and for opening said last mentioned sleeve when said members are coupled.

4. In an automatic coupling for vehicles, the combination of two coöperating coupling members, each comprising a wedge-shaped block and an adjacent cavity of corresponding shape, the wedge block of one member being adapted to engage in the cavity of the other member, the wedge blocks being provided with passages issuing on their meeting faces and adapted to form straight through conduits for the communication of brake steam-heating and other pipes, said meeting faces being adapted to be wedged together for coöperation of the opposite faces with the corresponding face of the cavity of the opposing member; a transverse snap-operating locking bolt in each of said members adapted to engage a socket in the opposite member when in coupled position, means operative from the side of the vehicle for withdrawing said locking bolts, valves on the pipes aforesaid, each having two separately movable ported sleeves, means connecting one of said sleeves to the bolt withdrawing means, and means for automatically closing the other of said sleeves when the members are uncoupled and for opening said last mentioned sleeve when said members are coupled.

In witness whereof I have signed this specification in the presence of two witnesses.

JOSEPH GIBSON ARCHBOLD.

Witnesses:
C. A. WALTER,
ETHAN RIDLEY.

Copies of this patent may be obtained for five cents each, by addressing the "Commissioner of Patents, Washington, D. C."